| United States Patent Office | 2,703,315 |
|---|---|
| | Patented Mar. 1, 1955 |

2,703,315

MANUFACTURE OF SHAPED ALUMINA PARTICLES

Maurice J. Murray, Naperville, and Reno W. Moehl, Brookfield, Ill., assignors to Universal Oil Products Company, Chicago, Ill., a corporation of Delaware No Drawing. Application December 16, 1950, Serial No. 201,234

4 Claims. (Cl. 252—448)

This invention relates to the manufacture of shaped alumina particles and more particularly to a novel method of manufacturing alumina particles of substantially spherical or spheroidal shape.

The use of alumina particles in substantially spherical or spheroidal shape offers numerous advantages, particularly when the alumina is used as an adsorbent, treating, refining or purifying agent, or as a catalyst or component of a catalyst for the conversion of organic compounds and still more particularly for the conversion of hydrocarbons. When used as a fixed bed of packing material in a reaction or contacting zone, the spheroidal shaped particles permit more uniform packing and thereby reduce variations in pressure drop through the bed and accordingly reduce channeling which otherwise results in a portion of the bed being by-passed. Another advantage to the use of particles of this shape is that the spheres contain no sharp edges to break or wear off during processing or handling and, therefore, the tendency to plug the process equipment is reduced. These advantages are magnified when the alumina particles are used as a moving bed, that is, when the particles are transported from one zone to another by either the reactants or by an extraneous carrying medium. It is thus seen that the use of particles of this shape permits a more effective utilization of the alumina.

In accordance with the present invention alumina spheres are formed by reacting an alumina sol of particular properties with a suitable organic basic compound which results in the formation of alumina gels at an elevated temperature. The preferred organic basic compound comprises hexamethylene tetramine. However, the use of hexamethylene tetramine in this process does have two disadvantages. In the first place, a considerable amount of hexamethylene tetramine is required and this in turn increases the cost of the raw material for the process. In the second place, the used hexamethylene tetramine must be disposed of and this in turn creates a disposal problem. The present invention is directed to a novel method of reducing the amount of hexamethylene tetramine required in the process.

In one embodiment the present invention relates to an improvement in the manufacture of shaped alumina particles by commingling alumina sol with an organic basic compound reactable therewith to form gel particles and passing the resultant mixture in finely divided form into a water immiscible suspending medium maintained at an elevated temperature, which comprises commingling gaseous ammonia with said alumina sol prior to the addition of said organic basic compound to said sol and intimately dispersing said gaseous ammonia throughout said sol.

Any suitable alumina sol may be utilized in accordance with the present invention. The alumina sol preferably contains an aluminum to chlorine ratio of less than 1:3. A preferred method of manufacturing the alumina sol comprises heating and digesting an aqueous solution of aluminum chloride in the presence of aluminum metal. In general this digesting temperature will range from about 175° to about 220° F. and for a time ranging from about 24 to 72 hours or more. It is also generally preferred that the ratio of aluminum chloride to aluminum metal is within the range of from about 1:3 to about 1:5. In some cases other aluminum salts, such as aluminum nitrate, etc. may be utilized in place of the aluminum chloride but not necessarily with equivalent results.

The alumina sol as prepared in the above manner is a colorless to a slightly yellow liquid and is readily soluble in water. While the gaseous ammonia may be added directly to the sol, it is generally preferred to form an aqueous solution which may contain from about 5% to about 35% of alumina calculated as $Al_2O_3$.

In accordance with the present invention gaseous ammonia is commingled with the alumina sol. It is an essential feature of the present invention that the ammonia is introduced in the gaseous state and also that it is intimately dispersed throughout the sol. Unless these precautions are observed, the sol will set up to gel immediately and therefore will be unsuitable for further processing in the desired manner. In a preferred embodiment, the gaseous ammonia is introduced by passing air through a dilute aqueous solution of ammonium hydroxide and introducing the resultant diluted gaseous ammonia into the alumina sol. Preferably the velocity of the gas stream should be sufficient to effect intimate dispersing thereof throughout the alumina sol. When desired, mixing paddles or other suitable means may be provided to insure intimate mixing. The ammonium hydroxide solution utilized is a dilute solution and preferably is of from about 0.5% to about 3% concentration. In another method ammonia gas may be metered with a stream of air and the resultant gas stream introduced into the alumina sol.

As will be shown by the data in the accompanying examples, the addition of aqueous 2% and 10% ammonium hydroxide solutions to the ammonia sol resulted in the immediate setting up of the alumina into a gel. It is thus seen that it is an essential feature of the present invention that the ammonia be introduced as a gas and still more particularly that the ammonia be diluted with air or other inert gas such as nitrogen, fuel gas, hydrogen, etc.

The introduction of gaseous ammonia into the alumina sol is continued so that the resultant mixture attains a pH of at least 5 to 5.5. The resultant mixture may be kept at temperatures of below about 50° F. and preferably of below about 40° F. for a considerable time without gelation occurring. In case some solution is carried over mechanically by the air stream, this may result in the formation of gel particles. It was observed that the small gel particles dissolved in the sol upon standing. However, in some cases it may be desirable to subject the sol to vigorous stirring or, in case some flocs still remain, to utilize a colloid mill or other suitable means to disperse the solid particles. The mixture will remain fluid at temperatures below about 50° F. for a considerable time but will form gel particles at an elevated temperature of from about 100° to about 212° F.

While the present invention is directed primarily to the use of ammonia gas in order to reduce the amount of the hexamethylene tetramine or other suitable organic basic compound required in the process, in another embodiment of the invention the introduction and intimate mixing of the ammonia gas may eliminate the necessity for using hexamethylene tetramine or other organic basic compound.

The sol containing ammonia introduced in the manner hereinbefore set forth may now be formed into firm gel particles by commingling the organic basic compound therewith and increasing the temperature of the resultant mixture. As hereinbefore set forth, hexamethylene tetramine is the preferred organic basic compound. Other suitable organic basic compounds may be utilized including the reaction product of ammonia with acetaldehyde, propionaldehyde, etc., or ammonium acetate and preferably a mixture of ammonium acetate and ammonium hydroxide, the mixture having a pH of below about 8.5, etc.

The hexamethylene tetramine is preferably prepared as an aqueous solution containing from about 15% to about 40% by volume of hexamethylene tetramine for ease in handling and also because solutions within this range have been found to result in more firm gel spheres. The solution of alumina sol and the solution of hexamethylene tetramine are commingled and, in a preferred embodiment of the present invention, droplets thereof are passed into a water immiscible suspending medium. In general it is preferred to use equal volumes of the sol solution and of the hexamethylene tetramine solution. However, it is understood that the ratios of these solutions may vary considerably and thus may range up to about 5 volumes or more of one solution per 1 volume of the other solution.

Any suitable water immiscible suspending medium may be used which will not vaporize at the temperatures employed. Particularly suitable suspending mediums comprise organic liquids such as kerosene, gas oil, Nujol, etc. The mixed solution of sol and hexamethylene tetramine preferably is dropped at room temperature or below into the suspending medium which is maintained at a temperature of from about 120° to about 220° F. and preferably of from about 190° to about 210° F. The volume of suspending medium employed should be sufficient to allow the required time for the droplets to set into firm hydrogel spheres. After removal of the spheres from the forming chamber, the spheres preferably are aged in oil or in any other suitable non-aqueous medium at a temperature of from about 150° to about 212° F. for at least 10 hours in order to insure sufficient time for formation of firm gel particles which will not disintegrate upon further handling or contact with water.

Spheres as formed in the above manner will have many uses including use as adsorbents, refining or purifying agents, or as a component in a catalyst for the reforming of organic compounds. The spheres are particularly suitable for use as a support or carrier for catalysts used in the conversion of hydrocarbons and thus may be composited in any suitable manner with a compound and particularly an oxide of one or more of the elements in groups 4, 5, 6 and 8 of the periodic table. These catalysts are particularly suitable for use in reforming, hydrogenation, dehydrogenation, desulfurization, etc. of hydrocarbons or other organic compounds.

The following examples are introduced to illustrate further the novelty and utility of the present invention but not with the intention of unduly limiting the same.

*Example I*

An alumina sol was prepared by digesting an aqueous solution of aluminum chloride hexahydrate in the presence of aluminum metal. The heating was effected at a temperature of 212° F. for 24 hours.

A few drops of a 10% aqueous ammonium hydroxide solution were added with vigorous mechanical stirring to a portion of the alumina sol and resulted in the immediate setting up of a gel as soon as the ammonium hydroxide solution contacted the sol.

*Example II*

The run described in Example 1 was repeated except that a 2% aqueous ammonium hydroxide solution was used. However, the result was the same in that gel set up immediately upon contacting of the solution with another portion of the sol which previously had been diluted with an equal volume of water in order that it would not be too viscous.

*Example III*

An ammonium hydroxide solution of 2% concentration was used in this example. A stream of air was passed through the ammonium hydroxide solution and the resultant gaseous stream was then introduced into the alumina sol which had first been diluted with an equal volume of water. The introduction of the gas stream was continued until the sol attained a pH of about 5. It was observed that some lumps had formed during the operation which were believed to have resulted from droplets of the solution carried over mechanically by the air stream. However, upon standing, the lumps dissolved in the sol. The resultant sol was stored at refrigeration temperature for over two days and remained in a fluid condition during this time.

A concentrated solution of hexamethylene tetramine was added to a portion of the sol in a ratio of 1 ml. of hexamethylene tetramine to 5.8 ml. of sol. The resultant mixture did not set up at room temperature but set up readily when the temperature was raised to 160°–175° F. On the other hand, the sol without the addition of hexamethylene tetramine did not set up into a gel when the temperature was raised to 160°–175° F.

In the absence of gaseous ammonia it is necessary to utilize approximately an equal volume of a 30% hexamethylene tetramine solution per volume of sol in order to obtain satisfactory alumina spheres when the mixture is dropped from a nozzle into a bath of Nujol maintained at a temperature of 195°–210° F. However, when adding the gaseous ammonia to the sol in the manner hereinbefore set forth, it was found that alumina spheres were formed by adding only 40% by volume of the 30% hexamethylene tetramine solution to the sol. Thus it is seen that a savings of hexamethylene tetramine solution of at least 60% was effected by utilizing the novel features of the present invention.

We claim as our invention:
1. A process for the manufacture of shaped alumina particles, which comprises intimately dispersing gaseous ammonia throughout an alumina sol and continuing the introduction of the gaseous ammonia to the sol until the resultant mixture attains a pH of about 5, thereafter adding an organic basic gelling agent and maintaining the mixture at below gelation temperature, passing the mixture in the form of droplets into a water-immiscible suspending medium maintained at a temperature of from about 120° to about 220° F. and retaining the droplets in said medium for a sufficient time to form hydrogel particles therefrom.
2. The process of claim 1 further characterized in that said gelling agent comprises hexamethylene tetramine.
3. The process of claim 1 further characterized in that the gaseous ammonia is introduced into the alumina sol in admixture with an inert gas.
4. The process of claim 1 further characterized in that the gaseous ammonia is introduced into the alumina sol in admixture with air.

References Cited in the file of this patent

UNITED STATES PATENTS

| Number | Name | Date |
|---|---|---|
| 2,400,709 | Patrick, Jr. | May 21, 1946 |
| 2,419,272 | Marisic | Apr. 22, 1947 |
| 2,422,499 | Pierce et al. | June 17, 1947 |
| 2,453,084 | Brown | Nov. 2, 1948 |
| 2,471,000 | Messenger | May 24, 1949 |
| 2,492,167 | Marisic et al. | Dec. 27, 1949 |
| 2,543,132 | Shabaker | Feb. 27, 1951 |
| 2,620,314 | Hoekstra | Dec. 2, 1952 |